(12) United States Patent
Coots

(10) Patent No.: US 6,217,752 B1
(45) Date of Patent: Apr. 17, 2001

(54) SEPTIC TANK ALARM SYSTEM

(76) Inventor: Terry L. Coots, 1649 Acworth Dr. West Rd., Kennesaw, GA (US) 30152

(*) Notice: Subject to any disclaimer, the term of this patent is extended or adjusted under 35 U.S.C. 154(b) by 0 days.

(21) Appl. No.: 09/473,037

(22) Filed: Dec. 28, 1999

(51) Int. Cl.⁷ ...................................................... G01F 23/20
(52) U.S. Cl. ........................ 210/86; 210/104; 210/532.2; 116/109; 340/612; 137/558; 73/290 R
(58) Field of Search ............................... 210/86, 104, 170, 210/532.1, 532.2; 116/109, 227; 340/612, 666; 137/558; 73/290 R

(56) References Cited

U.S. PATENT DOCUMENTS

| | | |
|---|---|---|
| 3,923,655 | 12/1975 | McKinney . |
| 3,954,612 | 5/1976 | Wilkerson . |
| 4,319,998 | 3/1982 | Anderson . |
| 4,348,278 | 9/1982 | Caccia . |
| 4,715,966 | 12/1987 | Bowman . |
| 5,696,493 | 12/1997 | Einck . |

*Primary Examiner*—Joseph W. Drodge
*Assistant Examiner*—Terry K. Cecil
(74) *Attorney, Agent, or Firm*—William B. Noll

(57) ABSTRACT

A two stage alarm system for detecting rising levels of sludge in septic tanks, and similar sedimentary tanks. The system, to detect a first or "caution" level, and a second or "critical" level of sludge, relies upon a pair of vertically positioned weight sensitive switching mechanisms which, when triggered by the rising levels of sludge, will send appropriate signals to a remote alarm mechanism, such as at the residence, to activate a "yellow" and/or "red" light, for example, thus alerting the owner of the tank to the need for remedial action.

7 Claims, 3 Drawing Sheets

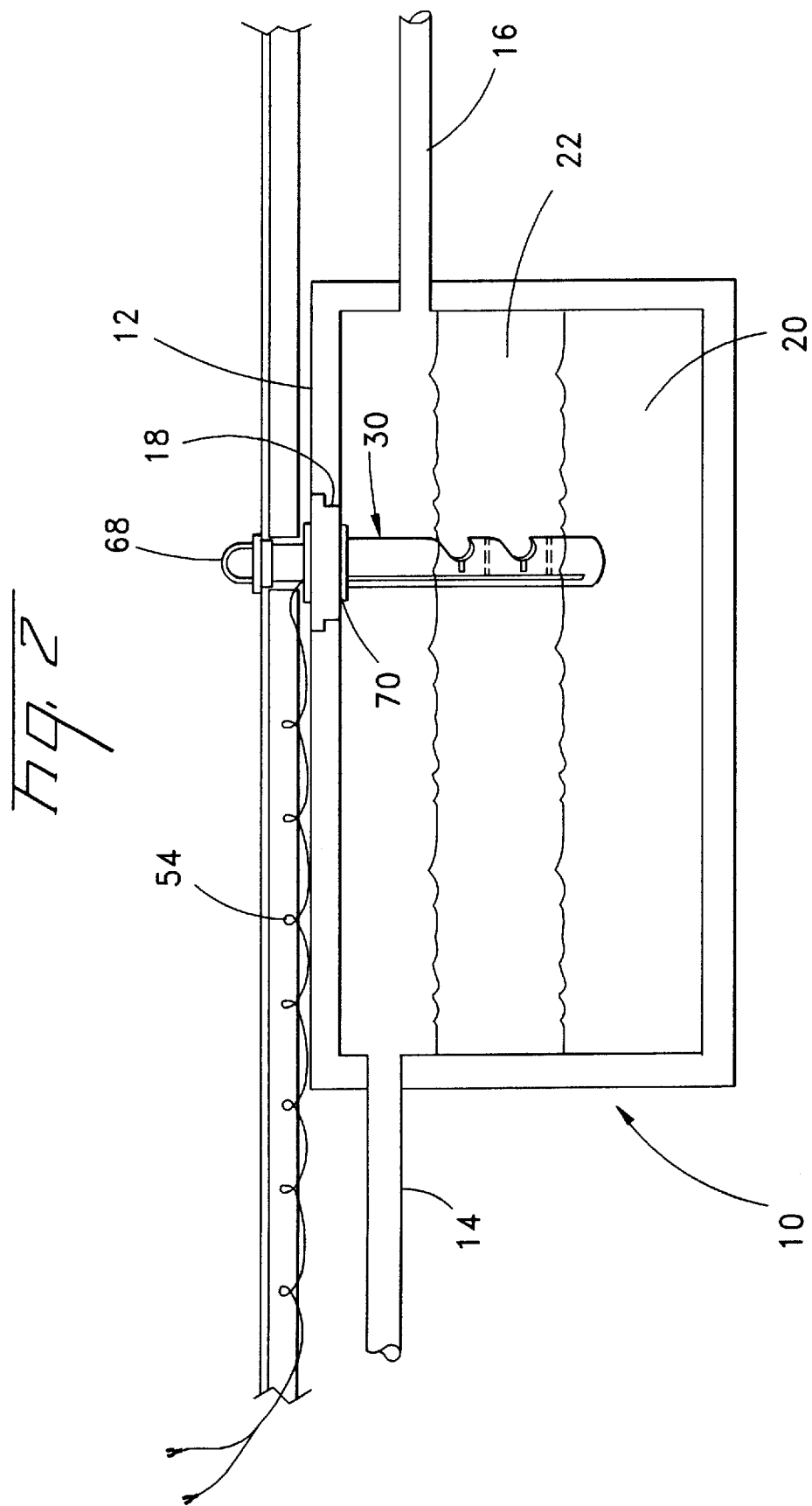

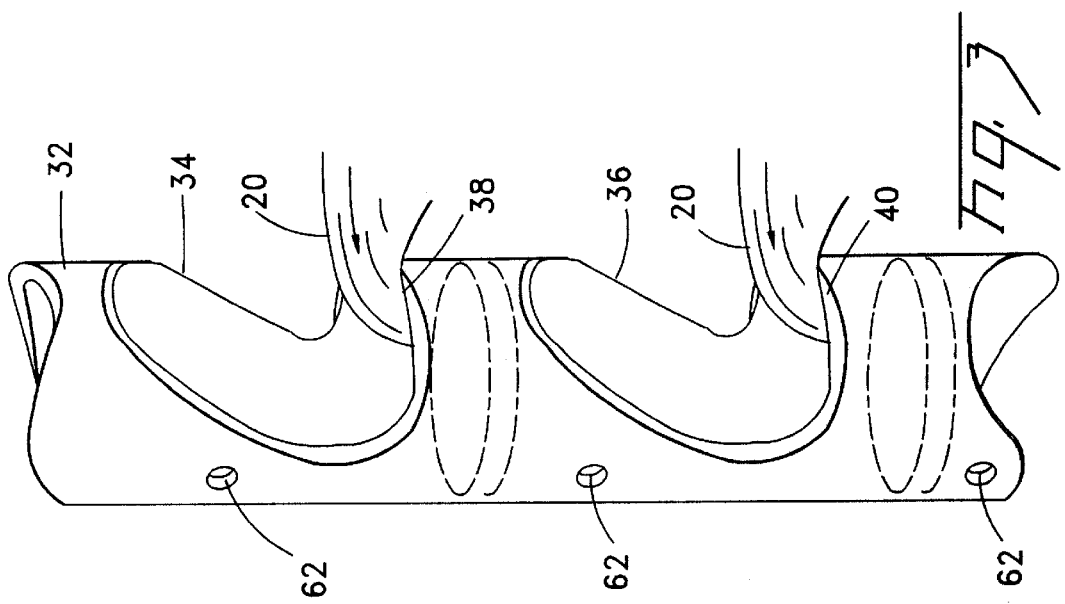
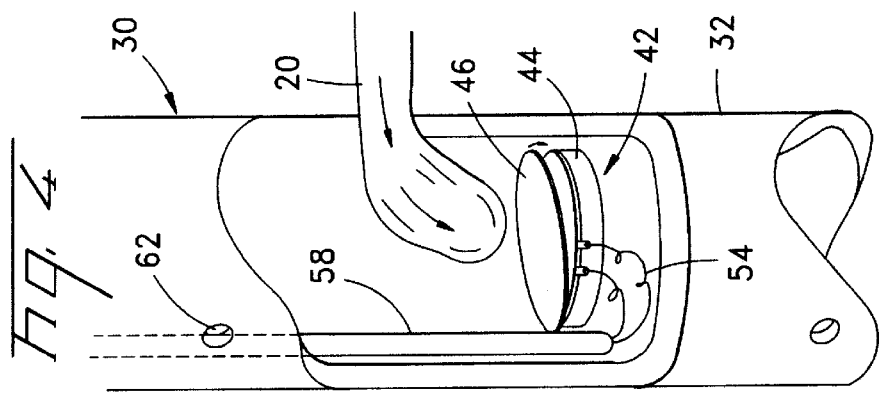
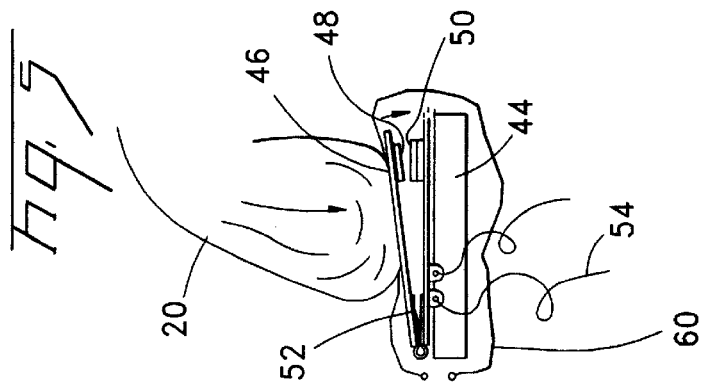

SEPTIC TANK ALARM SYSTEM

FIELD OF THE INVENTION

This invention is directed to the field of septic tanks, more particularly to a system for detecting high sludge levels and to alert the owner of the time to consider pumping the septic tank.

BACKGROUND OF THE INVENTION

The present invention relates to a two stage alarm system for alerting septic tank owners of high sludge levels and the need for cleaning and/or pumping the septic tank.

Septic systems generally comprise a septic tank and effluent disposal field interconnected by piping. The effluent disposal field comprises perforated pipes embedded in gravel and buried beneath the surface of the earth. Effluent fluids pass from the septic tank through the interconnecting pipe and to the effluent disposal field, where the fluid leaches into the surrounding gravel and earth.

The problem which generally causes clogging of the septic system is what can be referred to as "suspended solids" in the effluent. These suspended solids are almost invisible in the effluent and are located in the septic tank fluid between the layer of solids at the bottom of the tank and the outlet pipe to the effluent disposal field. As the layer of solids on the bottom of the tank become deeper, as it will in time, the layer of suspended solids is moved upwards into a more concentrated area in the tank. Eventually, the suspended solids move along with the effluent out of the septic tank through the interconnecting piping into the effluent disposal field and begin the process of clogging the system.

In order to alert owners of high sludge levels in the septic tank, and prevent the undesirable passage of rising sludge into the drain field or leach bed, the prior art has attempted to provide various systems to alert home owners, or other septic tank users, of unsatisfactory sludge levels in the septic tank. Several of such prior art systems are reflected in the following U.S. Patents:

a.) U.S. Pat. No. 3,923,655, to McKinney, teaches a system for determining the sludge level in a secondary sedimentation tank of a sewage treatment system. The temperature differential between the sludge layer and the supernatant is used to detect the sludge level. In response to a differential temperature indicating a pre-determined level of sludge in the tank, some of the sludge is wasted.

b.) U.S. Pat. No. 3,954,612, to Wilkerson, is directed to an above ground septic tank indicator, which indicates the water level in the tributaries leading from the tank so that any excess water therein may be pumped out before it causes a back up of sewage upstream of the septic tank.

c.) U.S. Pat. No. 4,319,998, to Anderson, relates to a monitor for an effluent disposal system for preventing suspended solids in an effluent from clogging a disposal field. A separate monitor housing having an inlet and an outlet is installed in the piping interconnecting a septic tank to a disposal field. A screening system in the housing screens out suspended solids. As the solids accumulate on the screening system over a period of time, the fluid level raises, actuating a float operated switch connected to means to signal that the system needs servicing. An additional float operated switch can be provided for indicating saturation of the disposal field.

d.) U.S. Pat. No. 4,348,278, to Caccia, teaches a monitoring arrangement for settlement tanks to permit determination of the prevailing distribution of suspended matter, including that depth of the lighter liquid at which an interface may exist with settled material of greater density, to permit selective removal of one of the fluids from the tank, for utilization or disposal. The monitoring arrangement comprises a probe displaceably mounted for movement downward through the liquid having detection means for sensing the instantaneous hydrostatic pressure acting on the head of the probe. One embodiment utilizes a display wherein the variation in density is evidenced as a change in the gradient of a pressure depth and/or pressure time characteristic. The provision of depth monitoring means for the probe head permits the provision of a subtractive feed back to compensate for the static head of the parent fluid, which by subtraction from the sensor head output provides a differential output responsive solely to variation in sensed pressure due to the presence of settling suspended matter creating a density change of the tank contents at the level being sensed.

e.) U.S. Pat. No. 4,715,966, to Bowman, is directed to a septic tank sludge level indicator including a float assembly that can be inserted downwardly into a septic tank through a permanently installed introducer tube or access pipe that has an upper end substantially flush with ground surface and provided with a removable cap for insertion and removal of the float. The float is constructed so that it will not be buoyant in a liquid material or floating scum on the upper surface of liquid material normally found in a septic tank but will be supported when the float comes into contact with collected sludge in the bottom portion of the septic tank with the upper end of the float assembly including indicia indicating the depth of sludge in the septic tank thereby providing an indication as to whether the sludge should be pumped from the tank.

While the prior art offers some solutions to the need for an alarm mechanism to alert a home owner, for example, of a rising level of sludge with the owner's septic tank, none appear to present a system that includes a dual alarm system, i.e. first a caution, then a critical alert, in the manner of the present invention. The manner by which this invention meets the desired goal hereof will become apparent to those skilled in the art from a reading of the following specification in conjunction with the various drawing.

SUMMARY OF THE INVENTION

This invention is directed to the combination of a treatment tank, i.e. septic tank, having a top in close proximity to ground level for collecting wastewater containing a quantity of solids from a structure, such as one's residence, where suspended sludge is separated in the tank by gravitational settlement from an overlying liquid, and a two stage sludge alarm system to detect rising levels of suspended sludge within the treatment tank. The system comprises a cylindrical housing extending through the tank top in interior communication with the overlying liquid and suspended sludge. The housing includes upper and lower openings in the wall to allow sludge access to the interior of the housing. Included within the housing are weight sensitive switches disposed within the cylindrical housing below each of the openings. The switches are rendered operative by the weight of sludge passing through the openings into contact with the switches. Finally, an electronic alarm is provided within the residence in electrical communication with the switches, where the electronic alarm is activated when at least one of the switches is rendered operative. The respective switches are preferably sealed within a flexible membrane to isolate the switch mechanism from the sludge. Further, the electronic alarm within the residence preferably includes dual alarm indicators, where a first such indicator cautions the owner of the rising level of sludge, and a second alarm indicator alerting the owner of a nearly full tank requiring remedial action.

Accordingly, an object of this invention is to provide a dual alarm system for septic tank users that alerts the user of impending danger levels of sludge with the septic tank, and the need to pump or clean the tank.

Another object hereof is the provision of a pair of switches that are automatically rendered operative by the weight of sludge thereagainst, indicating a rising level of sludge in the septic tank.

A further object of this invention lies in the use of sealed switches protected by flexible membranes to avoid contamination or malfunction of the switches.

These and other objects of the invention will become more apparent in the description which follows, particularly when read in conjunction with the accompanying drawings.

BRIEF DESCRIPTION OF THE DRAWINGS

FIG. 2 is a sectional view of the tank of FIG. 1 illustrating the submerged and positioned tubular alarm system hereof.

FIG. 3 is an enlarged perspective view of a portion of the housing for the tubular alarm system of this invention, showing dual entry openings for the sludge which triggers the alarm for a full or nearly full tank.

FIG. 4 is an enlarged perspective, cut-away view of the tubular housing for the system hereof, showing the pressure sensitive platform that is rendered operative by the weight of the incoming sludge.

FIG. 5 is a sectional view of a sealed pressure sensitive platform that triggers an alarm at a remote location, such as the owner's residence, that the tank is dangerously becoming filled with sludge.

DETAILED DESCRIPTION OF PREFERRED EMBODIMENTS

Figure 1:
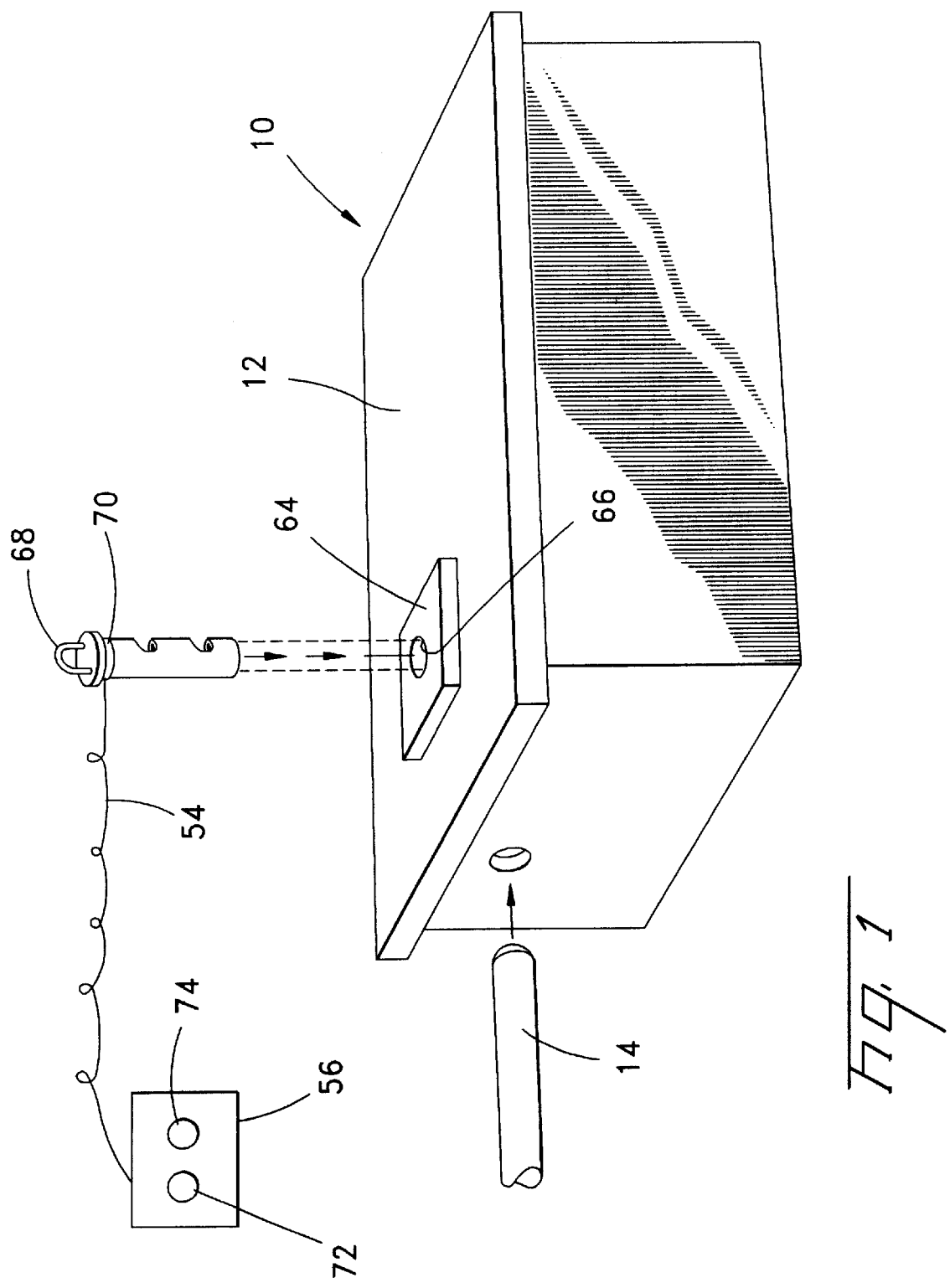
FIG. 1 is a perspective view of a sediment or septic tank showing, exploded therefrom, the two stage tubular alarm system poised for placement into the tank in accordance with the present invention.

This invention relates to a two stage sludge level alarm system for incorporation into a septic tank, or similar sedimentation tank, for example, that alerts the owner of the system of the rising levels of sludge within the septic tank, and the need to take action in having the tank pumped and/or cleaned. The invention will now be described with regard to the several Figures, where like reference numerals represent like components or features throughout the various views.

Turning first to FIGS. 1 and 2, there is shown a septic or wastewater treatment tank 10, typically installed below ground (FIG. 2), having a top wall 12 in close proximity to ground level. The tank is provided with an inlet pipe 14, bringing wastewater, etc. from the residence, for example, and an outlet pipe 16, at the opposite end of the tank, for transferring effluent to the leach bed or drain field. Typically, as known in the art, the tank 10 includes an access opening 18 along the top wall 12. An operating tank, as best seen in FIG. 2, includes digesting sludge 20 collecting on the bottom of the tank, and liquid material 22 overlying the sludge. In a conventionally operating septic tank, the sludge level builds up requiring pumping of the tank. If this is not done, sludge particles become entrained in the liquid effluent and are discharged into the leach bed or drain field causing clogging and an inoperative system.

The present invention, as best illustrated in FIGS. 3 to 5, comprises a two stage, sludge level alarm system 30 that alerts the home owner of the rising level of sludge. The sludge level alarm system 30 comprises a cylindrical housing 32, preferably formed of PVC or other plastic, of a length to be positioned within the septic tank 10, see FIG. 2. The housing includes upper and lower broad mouth openings 34, 36, of a size to readily pass rising sludge 20 reaching the respective openings.

Disposed interiorly, just below the lowermost part 38, 40 of the openings 34, 36, respectively, is a spring biased, weight sensitive, micro switch 42, where the switch comprises a fixed base 44 and a pivotal top 46, and the respective components include opposing electrical contacts 48, 50, in the inoperative position. The contacts are held apart by biasing spring 52. In other words, the circuit is open. The switches 42 are in electrical contact, via conductors 54, to an appropriate alarm mechanism 56 in the adjoining residence, structure, etc., see FIG. 1. For convenience and protection, the conductors 54 may be contained within a conduit 58 inside the cylindrical housing 32. To prevent contamination and/or interference with the operation of the switch 42, the switch is preferably enclosed and sealed within a flexible membrane 60, as best seen in FIG. 5.

To maintain and stabilize the cylindrical housing 32 within the septic tank 10, the housing wall may include plural openings 62 to allow liquid and/or sludge infusion into the housing to help equalize pressure inside and outside of the housing.

Returning to FIG. 1, the septic tank 10 includes a top wall 12 that may include an insert 64 for accessing the interior of the tank. By way of convenience, as the alarm system 30 may be positioned in a number of places, the insert 64 may include an opening 66 sized to slidably receive and position the cylindrical housing within the tank. To facilitate such placement, the cylindrical housing may include a handle 68. Further, to control or eliminate odors that may tend to emanate from the tank, a circular elastomeric seal 70, such as an O-ring, may be provided about the cylindrical housing 32 to seal the space between the housing and opening 66.

Continuing with FIG. 1, in conjunction with FIGS. 3–5, it will be observed that as the sludge level begins to enter the lower opening 36 the weight thereof soon overcomes the energy of spring 52 and brings the respective electrical contacts 48, 50 into electrical engagement, thus closing the circuit. This in turn sends an electrical signal to a remote location, such as the residence, that activates a first alarm mechanism 70, note FIG. 1. The alarm mechanism may actually comprise a dual system, where the lowennost switch 42 may activate a "yellow" light 72 to signify caution that the sludge level is rising. The second signal may be a "red" light 74 that is activated when the uppermost switch is rendered operative by the weight of the incoming sludge. The latter is truly an alerting message to the owner that quick action is required to pump or clean the tank to avoid damaging clogging of the septic system.

It is recognized that changes, variations and modifications may be made to the sludge level alarm system of this invention, particularly by those skilled in the art. Accordingly, no limitation is intended to be imposed on this invention except as set forth in the appended claims.

What is claimed is:

1. In combination with a treatment tank, having a top in close proximity to ground level for collecting wastewater containing a quantity of solids from a structure, where suspended sludge is separated by gravitational settlement from an overlying liquid,
   a two stage sludge level alarm system to detect rising levels of said suspended sludge within said treatment tank, said system comprising:
   a.) a cylindrical housing extending through said top in interior communication with said overlying liquid and suspended sludge;
      i.) upper and lower openings in a sidewall of said cylindrical housing;
      ii.) weight sensitive switches disposed within said cylindrical housing below said openings, where said switches are rendered operative by the weight of sludge passing through said openings into contact with said switches; and
   b.) an electronic alarm within said structure in electrical communication with said switches, where said electric alarm is activated when at least one of said switches is rendered operative.

2. The combination according to claim 1, wherein said weight sensitive switches are enclosed within a sealed, flexible membranes to protect said switches from exposure to said sludge.

3. The combination according to claim 2, wherein said cylindrical housing includes plural apertures to allow sludge and liquid flow into said housing for pressure equalization.

4. The combination according to claim 1, wherein said electronic alarm is a dual alarm, each said alarm connected to a respective switch.

5. The combination according to claim 1, wherein said tank is provided with access means above ground level for inspection and removal of said cylindrical housing from said treatment tank.

6. The combination according to claim 5, wherein said treatment tank includes a port along said top for positioning said cylindrical housing within said treatment tank, and an encircling elastomeric seal about said cylindrical housing in communication with said port.

7. The combination according to claim 1, wherein each said switch includes a spring biased pivotal plate and a base plate, where the weight of the incoming sludge overcomes said biased spring to bring said pivotal plate into contact with said base plate to thereby close the said switch and causing said electronic alarm to activate.

* * * * *